United States Patent [19]

Shorey et al.

[11] Patent Number: 4,802,572
[45] Date of Patent: Feb. 7, 1989

[54] AIRCRAFT CARGO ROLLER SYSTEM

[75] Inventors: Thomas H. Shorey, Mill Creek; Mark W. Shorey, Seattle, both of Wash.

[73] Assignee: The Boeing Company, Seattle, Wash.

[21] Appl. No.: 115,383

[22] Filed: Nov. 2, 1987

[51] Int. Cl.$^4$ .............................................. B65G 13/06
[52] U.S. Cl. ................................ 198/791; 244/118.1; 74/337.5; 74/567; 74/569
[58] Field of Search ................ 198/781, 791; 414/529, 414/530; 244/118.1; 74/567, 569, 104, 337.5; 192/93 A

[56] References Cited

U.S. PATENT DOCUMENTS

| | | | |
|---|---|---|---|
| 778,613 | 12/1904 | Ward | 198/791 X |
| 1,153,605 | 9/1915 | Clark | 198/791 X |
| 1,221,925 | 4/1917 | Trott | 74/337.5 X |
| 2,845,807 | 8/1958 | Harless | 192/93 A |
| 3,667,589 | 6/1972 | Constable | 198/781 X |
| 3,696,686 | 10/1972 | Steele | 74/337.5 |
| 4,015,706 | 4/1977 | Goffredo et al. | 198/791 X |
| 4,131,420 | 12/1978 | Miller | 198/791 X |
| 4,205,746 | 6/1980 | Olson et al. | 198/791 |
| 4,733,772 | 3/1988 | Potter | 198/781 |

FOREIGN PATENT DOCUMENTS 890021 9/1953 German Democratic Rep. ..................... 74/337.5

Primary Examiner—Robert J. Spar
Assistant Examiner—Cheryl L. Gastineau
Attorney, Agent, or Firm—Christensen, O'Connor, Johnson & Kindness

[57] ABSTRACT

A cargo roller system (10) having drive rollers (13) and idler rollers (19) mounted in a tray (14) and selectively engageable with a motor (30) through a gear train (44). The motor (30) engages the gear train (44) through an idler gear (48) mounted in a motor mount (32) and a driven gear (50) mounted to the shaft (52) of the gear train (44). Coupling assemblies (60) connect the two halves of the gear train (44) to the driven gear (50). The coupling assembly (60) comprises a shaft (52) having a cylindrical piston (62) formed on one end thereof and a cylinder (66) slidably receiving the piston (62) on the other end thereof. A V-shaped opening (70) in the outer wall (72) of the cylinder (66) cooperates with a retaining pin (74) passing through the piston (62) translationally moving the gear train (44) into engagement with the rollers as the cylinder (66) is rotated by the motor (30).

13 Claims, 5 Drawing Sheets

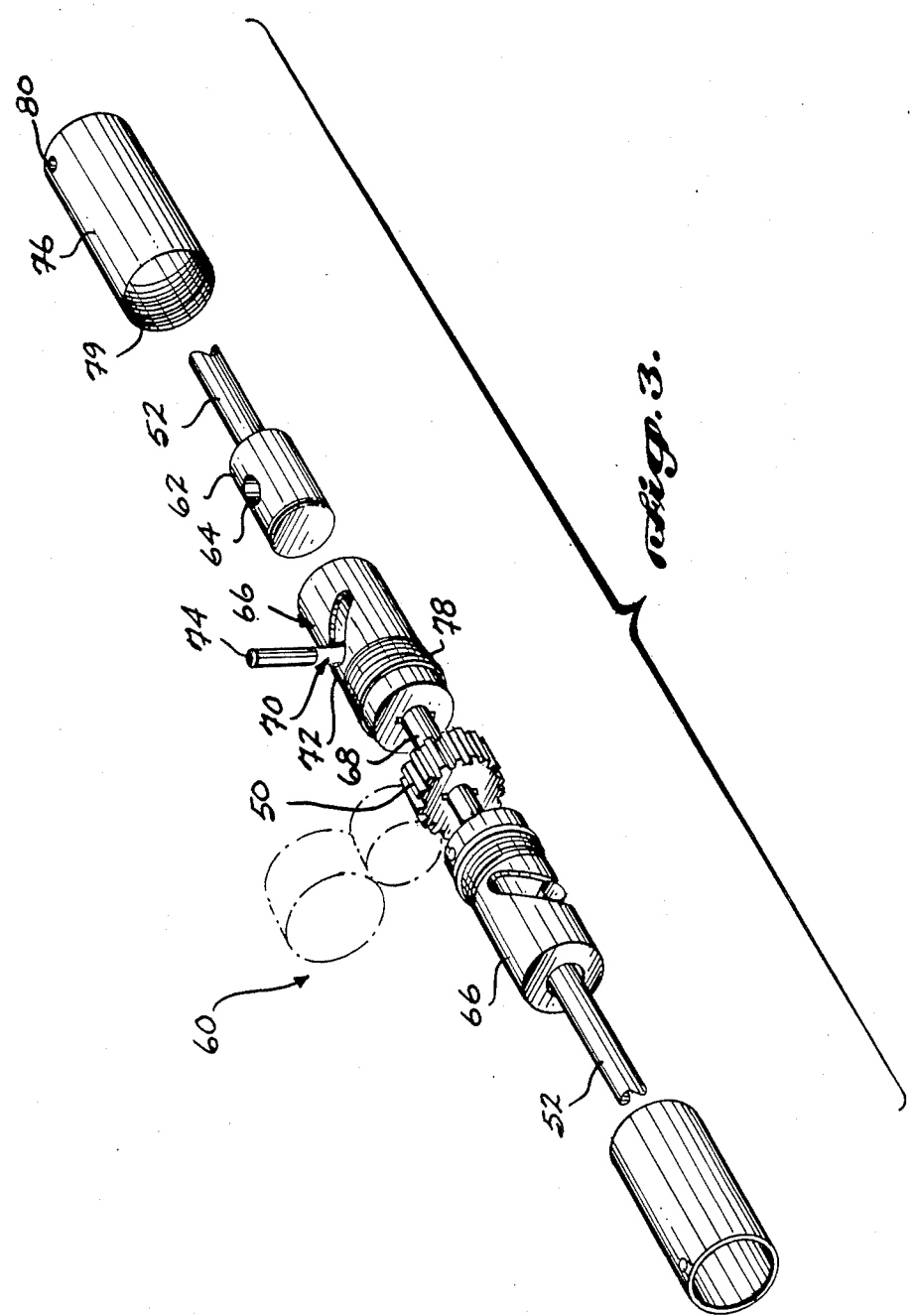

AIRCRAFT CARGO ROLLER SYSTEM

TECHNICAL FIELD

This invention pertains to cargo conveyors, and, more particularly, to a cargo roller system having rollers and a drive motor and a coupling assembly for selectively engaging and disengaging the drive motor and the rollers.

BACKGROUND OF THE INVENTION

Floor-mounted powered cargo systems are used to facilitate movement of cargo containers inside the main deck and lower lobe compartments of wide-bodied aircraft. While movement of cargo inside an aircraft has traditionally been done by hand, the development of large and heavy cargo containers necessitates the use of a powered cargo system. One prior cargo system uses a plurality of pneumatic rollers, each roller being powered by an individual motor. The roller and motor unit is pivotally mounted in a floor recess. A disadvantage of this prior system is that the pneumatic rollers tend to lose air and go flat. Another disadvantage of this system is that the limited vertical floor space in an aircraft restricts the diameter of the roller. As a result, the tractional bearing area of each roller is so small that for heavy containers or containers having slick bottom surfaces manual help is required to move them in the compartment. Furthermore, because of the recessed floor mounting, any repositioning of the units requires structural modification of the floor.

One proposal for overcoming the disadvantages associated with this prior system suggests using a solid roller in place of the pneumatic roller. This proposal has the drawback of increasing the weight of the cargo system. Another proposed design replaces the pneumatic roller with a plurality of small diameter, solid rollers driven by a single motor. While this design successfully increases tractional bearing area and decreases the weight borne by a single roller, it has proved unsuitable for aircraft cargo systems because it does not permit automatic or manual engagement and disengagement of the rollers with the drive motor. This drawback prevents loading or unloading of the cargo compartments should electric power not be available. This drawback also prevents selective movement of individual cargo containers that simultaneously overlap one or more sets of rollers with another cargo container. Finally, this system has no means for limiting the amount of torque that can be applied to the roller drive train to avoid damage in overload conditions.

SUMMARY OF THE INVENTION

The present invention overcomes the foregoing and other disadvantages by providing an aircraft cargo roller system having a plurality of drive rollers selectively engageable with a drive motor. The cargo roller system comprises one or more rotatable rollers coupled to a motor means by a rotatable coupler. The rotatable coupler comprises a first member coupled to the motor means, a second member engageable with the drive rollers, and a position control means connecting the first and second members together. The position control means is configured so that upon rotation of the first member by the motor means, the second member, when initially out of engagement with the drive rollers, will be first moved translationally along its longitudinal axis into engagement with the rollers, and then rotated to thereby rotate the drive rollers; and upon rotation of the motor means in an opposite direction, the second member will be first disengaged from the drive rollers, then engaged with the rollers, and then rotated to thereby rotate the drive rollers in the opposite direction.

In accordance with another aspect of the present invention, the position control means is further configured so that upon deactivation of the motor means, the second member of the position control means can be disengaged from the drive rollers upon manual rotation of the drive rollers.

In accordance with yet another aspect of the present invention, the second member of the rotatable coupler preferably comprises a shaft; the first member preferably comprises a cylinder having a wall and an internal axial bore for slidably receiving the shaft; and the position control means preferably comprises a cam means formed in the wall of the cylinder and follower means formed on the shaft to cooperate with the cam means for retaining and positioning the shaft within the internal axial bore of the cylinder. In addition, the follower means comprises a retaining pin insertable through the shaft and the cam means comprises one or more openings formed in the walls of the cylinder for receiving the retaining pin.

In accordance with still another aspect of the present invention, the cargo roller system also includes a load limiting means that limits the load applied to the drive rollers by the cargo. Preferably, the torque limiting means comprises one or more idler rollers in parallel axial alignment with the drive rollers. The one or more idler rollers have a diameter less than the diameter of the drive rollers to thereby limit the amount of load exerted on the drive rollers and to permit the drive rollers to slip with respect to the cargo when subjected to a predetermined load. In accordance with yet another aspect of the present invention, a cylindrical sleeve is provided for attachment over the cylinder to cover the cylinder and the one or more openings to thereby hold the retaining pin in engagement with the shaft and the one or more openings.

BRIEF DESCRIPTION OF THE DRAWINGS

The foregoing and other advantages and features of the present invention will be better understood from the following description of the preferred embodiment of the invention when taken in conjunction with the following drawings, wherein:

FIG. 3 is an enlarged isometric exploded view of the coupler assembly;

DETAILED DESCRIPTION OF THE PREFERRED EMBODIMENT

Figure 1:
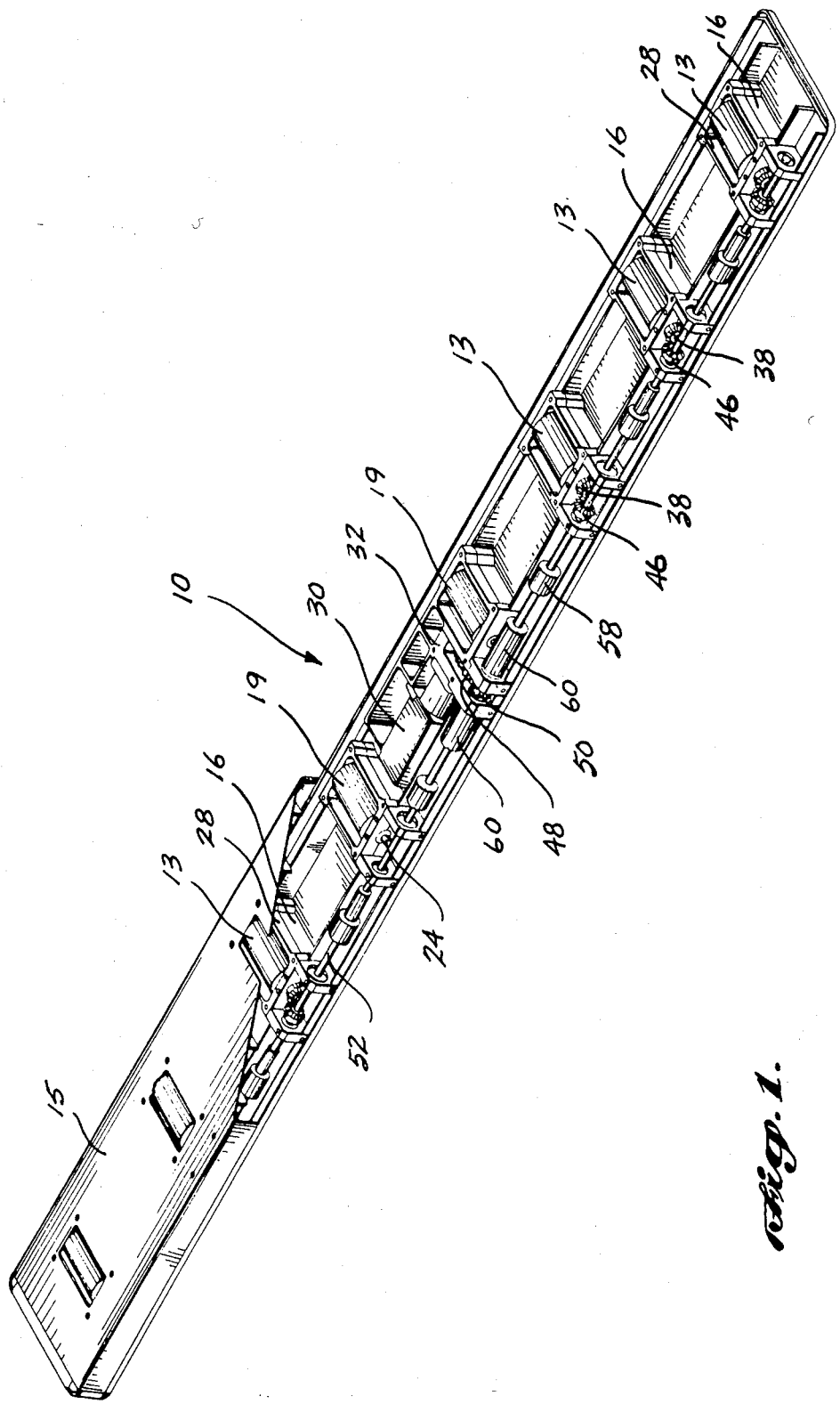
FIG. 1 is an isometric cutaway view of the cargo roller system formed in accordance with the present invention.
Figure 2:
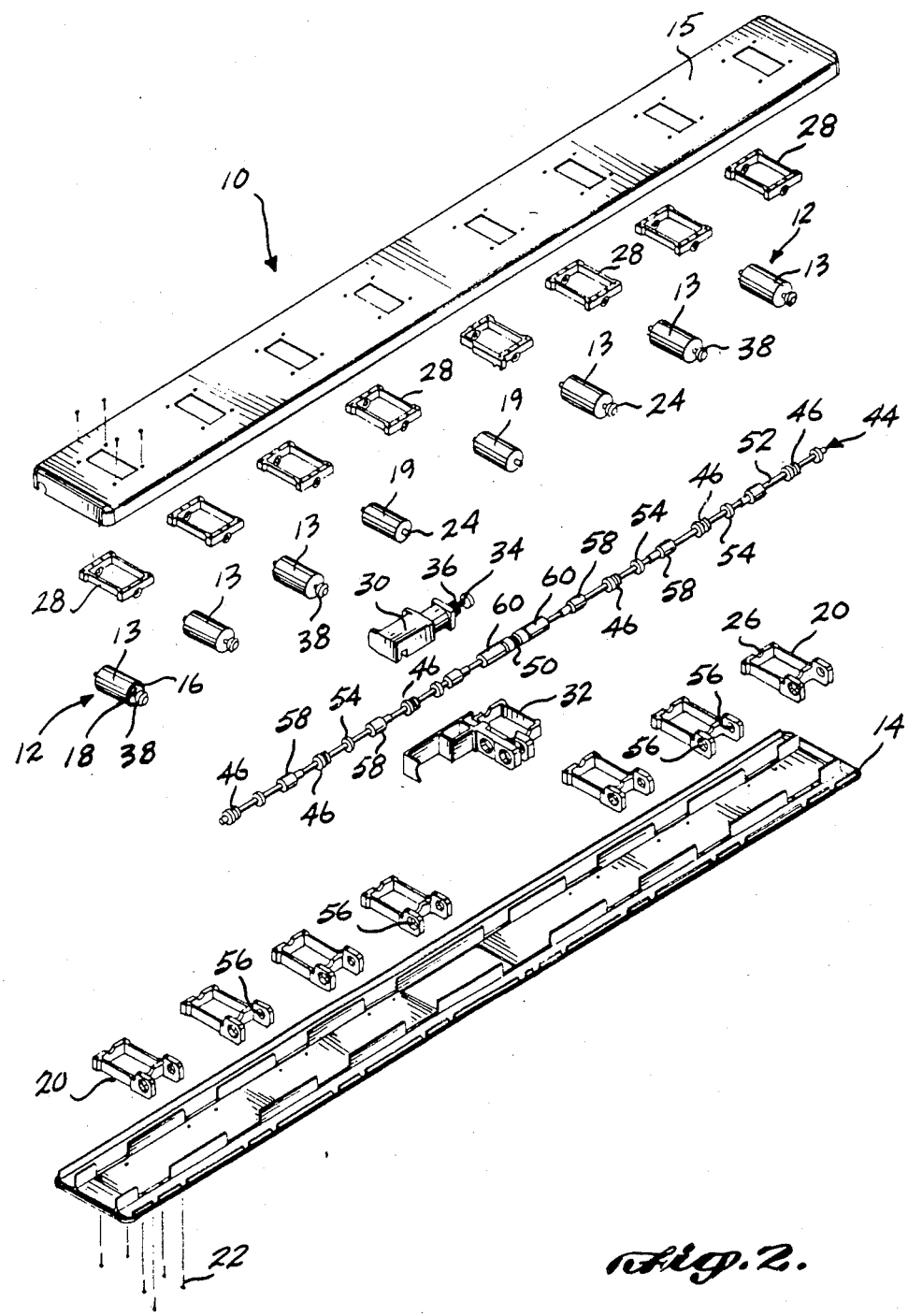
FIG. 2 is an isometric exploded view of the cargo roller system of FIG. 1.

Referring initially to FIGS. 1 and 2, the aircraft cargo roller system 10 comprises a plurality of rollers 12 mounted in an elongate roller tray 14 having a tray cover 15. The rollers 12 consist of drive rollers 13, constructed of a compressible roller tire 16 formed about a solid roller wheel 18 and idler rollers 19 constructed of a solid roller. The rollers 12 are supported by a roller bearing block 20 mounted to the tray 14 by fasteners 22. Passing through and extending out of each roller wheel 18 is an axle 24 that rests in grooves 26 formed in the bearing blocks 20. The rollers 12 are oriented in the bearing blocks 20 so that their longitudinal axis is transverse to the longitudinal axis of the tray 14. Caps 28 are fastened to the tops of the bearing blocks 20 to retain the axles 24 in the grooves 26.

An electrically powered motor 30 is mounted in the tray 14 by a motor mount 32. A drive gear 34 is mounted to the shaft 36 of the motor 30. Likewise, a beveled roller gear 38 is mounted to one end of the axles 24 of the rollers 12. In the preferred embodiment illustrated in FIGS. 1 and 2, the rollers 12 consist of six drive rollers 13 and two idler rollers 29, with the two idler rollers 19 having no gear on their axles 24. The function of these idler rollers 19 will be described in more detail below.

The electrically powered motor 30 drives the drive rollers 13 through an assembly of gears generally denoted as gear train 44. The gear train 44 is mounted parallel to the longitudinal axis of the tray 14 and has a plurality of beveled gears 46 that mesh with the beveled roller gears 38 on the drive rollers 13. The motor 30 engages the gear train 44 through an idler gear 48 mounted in the motor mount 32 and a driven gear 50 mounted to the shaft 52 of the gear train 44. Also mounted on the shaft 52 are a plurality of bearings 54 for supporting the shaft in the plurality of openings 56 in the roller bearing blocks 20. In addition, torque dampers 58 are provided at spaced intervals between the beveled gears 46 to insure teeth engagement of the bevel gears 46 and 38 that occurs during rotation of the gear train 44.

Located at the central portion of the gear train 44 are two coupling assemblies 60 that function to connect the two halves of the gear train 44 to the driven gear 50 and to engage and disengage the beveled gears 46 with the roller gears 38. FIG. 3 shows the internal construction of the coupling assembly 60, wherein the shaft 52 has a cylindrical piston 62 formed on the end thereof. An opening 64 passes transversely through the piston 62. A cylinder 66 is attached to each end of the drive shaft 68. The driven gear 50 is mounted on the drive shaft 68 between the two cylinders 66. Each cylinder 66 has an internal axial bore sized and shaped to slidably receive the piston 62 therein. A V-shaped opening 70 is formed in the outer wall 72 of the cylinder 66. Preferably, a second V-shaped opening 70 is located on the opposite side of the cylinder wall 72. A retaining pin 74 passes through the opposite side of the cylinder wall 72. A retaining pin 74 passes through the V-shaped opening 70 and the opening 64 to retain the piston 62 in slidable engagement within the cylinder 66. In order to prevent the retaining pin 74 from falling out of the openings 64 and 70, a cylindrical sleeve 76 is slid over the piston 62 and cylinder 66 assembly and is threadably attached to the cylinder 66 by means of threads 78 on the exterior of the cylinder wall 72 which cooperate with internal threads 79 on the cylindrical sleeve. In addition, a set screw may be passed through an opening 80 in the cylindrical sleeve 76 to prevent the sleeve 76 from backing off the threads 78 on the cylinder 66.

Figure 4A:
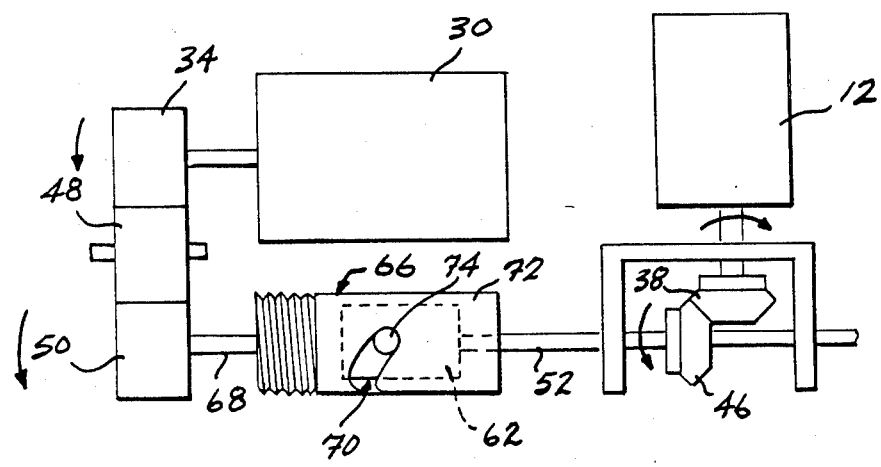
FIGS. 4a-c are pictorial diagrams showing the sequence of operation of the coupler assembly.
Figure 4B:
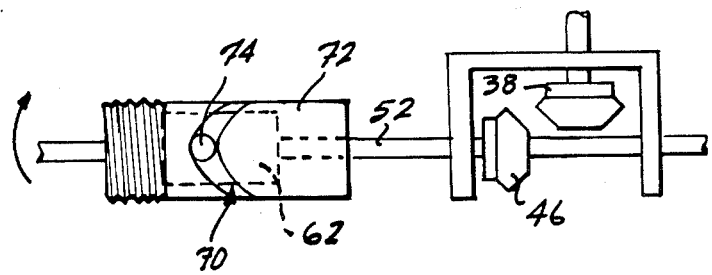
Figure 4C:
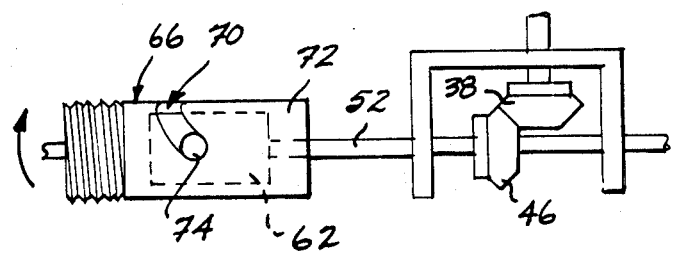

The openings 64 and 70 cooperate with the retaining pin 74 and the slidable piston 62 to selectively engage and disengage the beveled gears 46 with the roller gears 38. FIGS. 4a-c illustrate the sequence of movements that take place during operation of the cargo roller system 10. In FIG. 4a the motor 30 is shown initially rotating the drive gear 34 in the direction indicated by the arrow. The drive gear 34 rotates the engaged idler gear 48 that in turn rotates the driven gear 50 in the same direction as the drive gear 34. The driven gear 50, through the shaft 68, rotates the cylinder 66. The retaining pin 74, protruding into the opening 70, becomes engaged by the cylinder wall 72. As the cylinder 66 rotates in the direction shown, the retaining pin 74 forces the piston 62 and the associated shaft 52 to rotate in the same direction as the cylinder 66. As a result, the beveled gear 46, already engaged with the roller gear 38, causes rotation of the drive rollers 13 in the direction indicated by the arrow.

In FIG. 4b the motor 30 has stopped and begun reversing direction of rotation of the drive gear 34. As the cylinder 66 begins to rotate in the opposite direction, the openings 64 and 70 force the retaining pin 74 and the associated piston 62 to be pulled further within the internal axial bore of the cylinder 66, as indicated by the arrow. This results in the shaft 52 pulling the attached beleved gear 46 out of engagement with the roller gear 38. As the beveled gear 46 is disengaged, rotation of the piston 62 and the shaft 52 has ceased, thus providing little or no resistance to the disengagement of the beveled gear 46. At this point, the motor 30 may then be shut off, thus keeping the gear train 44 disengaged from the drive rollers 13. This permits the drive rollers 13 to freely roll.

If the rotation of the cylinder 66 is continued in the direction as indicated by the arrow, the openings 64 and 70 will force the retaining pin 74 and the piston 62 to slide to the right, as shown in FIG. 4c. The movement of the piston 62 forces the beveled gear 46 to again engage the roller gear 38. During the period of time that the beveled gear 46 is engaging the roller gear 38, the shaft 52 is not rotating, thus permitting the beveled gear 46 to easily mesh with the roller gear 38. As the ends of the openings 64 and 70 rotate around, the cylinder wall 72 contacts the retaining pin 74 and causes the shaft 52 and the beveled gear 46 to rotate, thus causing the drive rollers 13 to rotate in an opposite direction, as indicated by the arrow.

The particular configuration illustrated in FIGS. 4a-c also permits manual disengagement of the gears. For instance, should the motor 30 be shut off while the beveled gear 46 is engaged with the roller gear 38, manual pressure on one or more of the drive rollers 13 will cause the roller gears 38 to put pressure on the beveled gears 46, urging them out of engagement. As the shaft 52 and the piston 62 are moved to the left by the disengagement of the gears, as indicated in FIG. 4b, the cylinder 66 will be forced to rotate in the direction indicated by the arrow. The de-energized motor 30 allows the driven gear 50 to rotate the drive gear 34 as the cylinder 66 is rotated by the disengaging gears, completing the disengagement.

Figure 5:
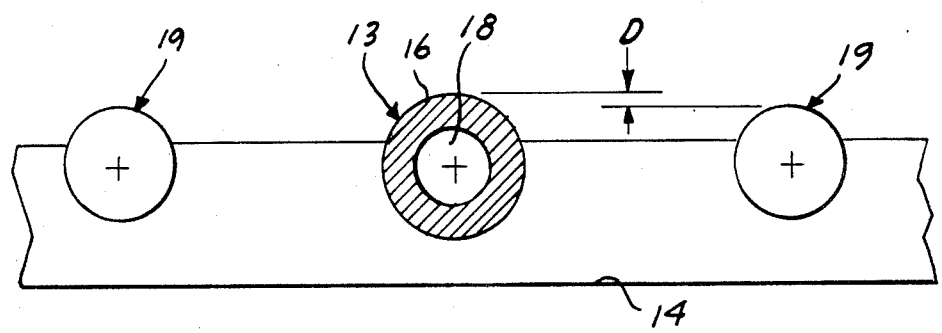
FIG. 5 is a pictorial side view illustrating the idler roller and the drive roller configuration.

In order to provide adequate load bearing and traction area, the outside diameter of the drive rollers 13 is preferably two inches. The roller tire 16 may be constructed from nitrile rubber or neoprene of preferably 70–80 shore hardness. The use of this material permits a limited amount of deflection of the roller tire 16 as the heavy cargo pallet bears down on it. FIG. 5 is a cross-sectional pictorial illustration showing the drive roller 13 mounted in the roller tray 14. The roller tire 16 has a preferable thickness of approximately one-half inch and is bonded to the roller wheel 18. Also shown in FIG. 5 are two idler rollers 19 mounted axially parallel to, and at the same axial height as, the drive roller 13. The idler rollers 19 function to limit the amount of load applied to the drive roller 13 in order to prevent damage to the gears or motor in overload conditions. As illustrated, the idler roller 19 is solid, and has an outside diameter smaller than the outside diameter of the drive roller 13. By placing at least two idler rollers 19 on each cargo roller system 10, the amount of deflection D of the roller tire 16 will be limited. This permits the drive rollers 13 to slip with respect to the bottom surface of the cargo container should the cargo container be heavier than the load bearing capacity of the cargo roller system. The limitation on the amount of deflection may be varied by changing the outside diameter of the idler rollers 19. FIG. 1 shows the preferred position of the idler rollers 19 as being immediately on either side of the motor 30, although they may be positioned further outboard.

As will be appreciated from the foregoing description, the present invention provides a cargo roller system that is of a small size, light weight, and easily relocatable. The unique cam-follower configuration of the coupler assembly permits selective engagement and disengagement of the electrically powered motor with the drive rollers. In addition, the coupling system permits manual disengagement of the rollers in the event of a power failure or an inoperative motor. The low profile of the roller tray facilitates relocation of the cargo roller system by not requiring modification of the existing floor structure. In addition, easy access is available to the internal structure of the cargo roller system through the quickly removable cover. Finally, the torque limiting feature achieved through the use of idler rollers provides protection to the gear train while eliminating the need for complex and heavier automatic slip devices. It is to be understood that while the preferred embodiment has been described in the context of aircraft cargo systems, the present invention has application outside of the aircraft art. In addition, while a preferred embodiment of the invention has been illustrated and described, it will be appreciated that various changes can be made therein without departing from the spirit and scope of the invention. For instance, the motor may be located towards one end of the roller tray with only one coupling assembly located on the drive shaft. Consequently, the invention cna be practiced otherwise than as specifically described herein.

The embodiments of the invention in which an exclusive property or privilege is claimed are defined as follows:

1. An aircraft cargo roller system, comprising:
   one or more rotatable rollers for supporting and moving cargo;
   motor means for rotating the rollers; and
   at least one rotatable coupler for coupling the motor means to the rollers, the coupler comprising:
     a first member coupled to the motor means;
     a second member having a longitudinal axis and engageable with the rollers; and
     a position control means connecting the first and second members together, the position control means being configured so that upon rotation of the first member by the motor means, the second member, when initially out of engagement with the rollers, will be first moved translationally along its longitudinal axis into engagement with the rollers, and then rotated to thereby rotate the rollers, and upon rotation of the motor means in an opposite direction, the second member will sequentially be first disengaged from the rollers, then engaged with the rollers, and then rotated to thereby rotate the rollers in the opposite direction.

2. The cargo roller system of claim 1, wherein the position control means is further configured so that upon deactivation of the motor means, the second member of the position control means can be disengaged from the rollers upon manual rotation of the rollers.

3. The cargo roller system of claim 2, wherein the second member of the rotatable coupler comprises a shaft, and the first member comprises a cylinder having a wall and an internal axial bore for slidably receiving the shaft, and the position control means comprises cam means formed in the wall of the cylinder and follower means formed on the shaft to cooperate with the cam means for retaining and positioning the shaft within the internal axial bore of the cylinder.

4. The cargo roller system of claim 3, further comprising a torque limiting means for permitting rotation of said coupler by said motor means when the rollers are subjected to a load greater than the load driving capacity of the motor means.

5. The cargo roller system of claim 4, wherein the torque limiting means comprises one or more idler rollers in parallel axial alignment with the rotatable rollers, the one or more idler rollers having a diameter less than the diameter of the rotatable rollers to limit the amount of load exerted on the rotatable rollers and to permit the rotatable rollers to slip with respect to the cargo when subjected to a predetermined load.

6. The cargo roller system of claim 3, wherein the follower means comprises a retaining pin insertable through the shaft and the cam means comprises one or more openings formed in the walls of said cylinder for receiving the retaining pin.

7. The cargo roller system of claim 6, wherein the one or more openings are V-shaped.

8. The cargo roller system of claim 7, further comprising a cylindrical sleeve for attachment over the cylinder to cover the cylinder and the one or more openings to thereby hold the retaining pin in engagement with the shaft and the one or more openings.

9. An aircraft cargo roller system comprising:
   a plurality of rotatable rollers for supporting and driving cargo, each roller secured to a roller shaft for rotation about a longitudinal axis;
   a tray for holding the plurality of rotatable rollers in parallel axial relationship;
   at least one drive shaft mounted in the tray for rotation about an axis transverse to the longitudinal axis of the rotatable rollers and for translational movement along the transverse axis for engagement and disengagement with the roller shafts;
   a drive motor mounted in the tray for rotating the drive shaft and the rollers; and
   at least one coupling assembly for coupling the drive motor to the drive shaft and for causing translational movement of the drive shaft to thereby engage and disengage the drive shaft with the rollers shafts, the coupling assembly comprising:
     a cylinder coupled to the drive motor, the cylinder having an internal axial bore for receiving the drive shaft in slidable engagement;

a retaining pin insertable through an opening in the drive shaft; and a first opening in the sidewall of the cylindrical sleeve and a second opening in the sidewall of the cylindrical sleeve, the second opening positioned 180 degrees about the circumference of the cylindrical sleeve from the first opening, the second opening being in alignment with the first opening to permit passage of the retaining pin through the cylindrical sleeve and the drive shaft to thereby retain the drive shaft in slidable engagement with the cylindrical sleeve; the first and second openings being sized and shaped to, upon activation of the drive motor when the drive shaft is initially engaged with the roller shafts, sequentially disengage the drive shaft from the roller shafts, then move the drive shaft along the transverse axis to engage the drive shaft with the roller shafts, and then rotate the drive shaft and the engaged roller shafts while preventing further translational movement of the drive shaft, the first and second openings being further configured that upon deactivation of the drive motor the drive shaft is translationally movable to disengage from the roller shafts when the plurality of rotatable rollers are manually rotated.

10. The cargo roller system of claim 9, further comprising a torque limiting means for permitting rotation of the coupling assembly by the drive motor when the rollers are subjected to a load greater than the load driving capacity of the drive motor.

11. The cargo roller system of claim 10, wherein the torque limiting means comprises one or more idler rollers in parallel axial alignment with the rotatable rollers, the idler rollers having a diameter less than the diameter of the rotatable rollers to limit the amount of load exerted on the rotatable rollers and to permit the rotatable rollers to slip with respect to the cargo when subjected to a predetermined load.

12. The cargo roller system of claim 9, wherein at least one of the first and second openings is V-shaped.

13. The cargo roller system of claim 9, further comprising a cylindrical sleeve for attachment over the cylinder to cover the cylinder and the first and second openings to thereby hold the retaining pin in engagement with the drive shaft and the first and second openings.

* * * * *